United States Patent
Li et al.

(10) Patent No.: US 12,333,950 B2
(45) Date of Patent: Jun. 17, 2025

(54) UNMANNED AERIAL VEHICLE-AIDED OVER-THE-AIR COMPUTING SYSTEM BASED ON FULL-DUPLEX RELAY AND TRAJECTORY AND POWER OPTIMIZATION METHOD THEREOF

(71) Applicant: China University of Mining and Technology, Xuzhou (CN)

(72) Inventors: Song Li, Xuzhou (CN); Yanjing Sun, Xuzhou (CN); Bowen Wang, Xuzhou (CN); Yu Zhou, Xuzhou (CN); Xiao Yun, Xuzhou (CN); Ruirui Chen, Xuzhou (CN); Jiaqi Li, Xuzhou (CN)

(73) Assignee: China University of Mining and Technology, Xuzhou (CN)

( * ) Notice: Subject to any disclaimer, the term of this patent is extended or adjusted under 35 U.S.C. 154(b) by 278 days.

(21) Appl. No.: 18/124,751

(22) Filed: Mar. 22, 2023

(65) Prior Publication Data
US 2024/0105064 A1    Mar. 28, 2024

Related U.S. Application Data

(63) Continuation of application No. PCT/CN2022/105164, filed on Jul. 12, 2022.

(30) Foreign Application Priority Data

Dec. 16, 2021    (CN) .......................... 202111561590.1

(51) Int. Cl.
*G08G 5/30*    (2025.01)
*G08G 5/26*    (2025.01)
(52) U.S. Cl.
CPC .................. *G08G 5/30* (2025.01); *G08G 5/26* (2025.01)

(58) Field of Classification Search
CPC ............ G08G 5/30; G08G 5/26; Y02D 30/70; H04W 84/06; H04W 84/18
See application file for complete search history.

(56) References Cited

U.S. PATENT DOCUMENTS 9,147,353 B1 *  9/2015  Slusar ................... G06Q 40/08
9,923,705 B2 *  3/2018  Mishra ...................... H04L 5/14
(Continued)

FOREIGN PATENT DOCUMENTS

CA        3186006 A1 *  6/2023  ............. H04L 45/16
CN      108566670 A  *  9/2018  ........... G06Q 10/047
(Continued)

OTHER PUBLICATIONS

"UAV-Assisted Over-the-Air Computation;" Fu et al., ARXIV ID: 2101.09856, Jan. 24, 2021. (Year: 2021).*
(Continued)

*Primary Examiner* — Khoi H Tran
*Assistant Examiner* — Jorge O Peche

(57) ABSTRACT

Disclosed is an unmanned aerial vehicle (UAV)-aided over-the-air computing system based on full-duplex relay and a trajectory and power optimization method thereof. The UAV-aided over-the-air computing system adopts the UAV as a full-duplex relay for data fusing and forwarding. The method of the application aims at minimizing an average mean square error of over-the-air computing, and solves an optimization problem under constraints of sensor transmitting power, information transmission rate, UAV trajectory and denoising factor. For an overall joint optimization problem, each optimization variable is determined one by one by an alternative optimization method according to the high coupling of optimization variables.

6 Claims, 2 Drawing Sheets

(56) References Cited

U.S. PATENT DOCUMENTS

| | | | |
|---|---|---|---|
| 10,554,375 B2* | 2/2020 | Luo | H04B 1/525 |
| 10,972,139 B1* | 4/2021 | Luo | H03F 3/24 |
| 10,979,097 B2* | 4/2021 | Luo | H04L 25/0254 |
| 11,197,180 B2* | 12/2021 | Uchiyama | H04W 8/005 |
| 11,206,050 B2* | 12/2021 | Luo | H04B 1/525 |
| 11,258,473 B2* | 2/2022 | Luo | G06N 3/08 |
| 11,340,345 B2* | 5/2022 | Wu | G01S 13/726 |
| 11,387,976 B2* | 7/2022 | Luo | H04B 7/0854 |
| 11,528,657 B1* | 12/2022 | Mangalvedhe | H04W 74/0833 |
| 11,941,516 B2* | 3/2024 | Luo | G06N 3/08 |
| 12,177,167 B2* | 12/2024 | Luo | H04W 4/40 |
| 2005/0021202 A1 | 1/2005 | Russell | H04B 7/18506 348/143 |
| 2016/0100415 A1* | 4/2016 | Mishra | H04L 5/14 370/277 |
| 2018/0115940 A1* | 4/2018 | Abedini | H04W 56/004 |
| 2018/0220294 A1* | 8/2018 | Ukil | H04W 76/10 |
| 2018/0324728 A1* | 11/2018 | Abedini | H04L 1/1819 |
| 2019/0065945 A1* | 2/2019 | Luo | G08G 1/0112 |
| 2019/0065951 A1* | 2/2019 | Luo | G08G 1/166 |
| 2019/0081766 A1* | 3/2019 | Luo | H04W 4/70 |
| 2019/0081767 A1* | 3/2019 | Luo | H04B 1/525 |
| 2019/0245565 A1* | 8/2019 | Luo | H04B 1/0475 |
| 2019/0245566 A1* | 8/2019 | Luo | H04B 1/525 |
| 2019/0373493 A1* | 12/2019 | Uchiyama | H04L 49/90 |
| 2020/0191913 A1* | 6/2020 | Zhang | G01S 7/412 |
| 2020/0191943 A1* | 6/2020 | Wu | G01S 13/726 |
| 2020/0204326 A1* | 6/2020 | Piechotta | H04L 27/30 |
| 2020/0205230 A1* | 6/2020 | Haustein | H04B 7/0617 |
| 2020/0229206 A1* | 7/2020 | Badic | G05D 1/225 |
| 2020/0244301 A1* | 7/2020 | Askar | H04B 1/40 |
| 2020/0389766 A1* | 12/2020 | Kim | H04W 72/04 |
| 2021/0036764 A1* | 2/2021 | Li | H04L 5/001 |
| 2021/0075464 A1* | 3/2021 | Luo | H04B 1/0475 |
| 2021/0084498 A1* | 3/2021 | Xu | H04W 12/122 |
| 2021/0092626 A1* | 3/2021 | Xu | H04W 12/037 |
| 2021/0153284 A1* | 5/2021 | Zhou | H04W 76/18 |
| 2021/0203469 A1* | 7/2021 | Abedini | H04W 72/56 |
| 2021/0320678 A1* | 10/2021 | Luo | G06N 3/08 |
| 2021/0321387 A1* | 10/2021 | Duan | H04L 27/26025 |
| 2021/0360575 A1* | 11/2021 | Abotabl | H04W 52/367 |
| 2022/0021421 A1* | 1/2022 | Park | H04B 7/0469 |
| 2022/0021428 A1* | 1/2022 | Park | H04B 7/0408 |
| 2023/0029173 A1* | 1/2023 | Abedini | H04W 52/325 |
| 2023/0050970 A1* | 2/2023 | Luo | H04B 7/15542 |
| 2023/0105748 A1* | 4/2023 | Abedini | H04W 52/325 370/318 |
| 2023/0118780 A1* | 4/2023 | Abotabl | G01S 5/0063 455/456.1 |
| 2023/0217298 A1* | 7/2023 | Chae | H04L 47/2441 370/328 |
| 2023/0224021 A1* | 7/2023 | Wang | H04B 7/18504 455/11.1 |
| 2023/0362969 A1* | 11/2023 | Abdelghaffar | H04W 72/51 |
| 2024/0056264 A1* | 2/2024 | Abdelghaffar | H04L 5/001 |
| 2024/0057097 A1* | 2/2024 | Abdelghaffar | H04W 72/23 |
| 2024/0078808 A1* | 3/2024 | Balasubramanian | G06V 20/50 |
| 2024/0114547 A1* | 4/2024 | Abdelghaffar | H04W 74/004 |
| 2024/0129755 A1* | 4/2024 | Jeon | G06N 3/098 |
| 2024/0163870 A1* | 5/2024 | Abdelghaffar | H04W 72/1268 |
| 2024/0202965 A1* | 6/2024 | Balasubramanian | H04W 4/46 |
| 2024/0223407 A1* | 7/2024 | Kim | G06N 3/04 |
| 2025/0008472 A1* | 1/2025 | Duan | H04W 52/0216 |
| 2025/0016619 A1* | 1/2025 | Jeon | H03M 7/3059 |

FOREIGN PATENT DOCUMENTS

| | | | | |
|---|---|---|---|---|
| CN | 110324805 A | | 10/2019 | |
| CN | 110417458 A | | 11/2019 | |
| CN | 110543185 A | | 12/2019 | |
| CN | 111010223 A | | 4/2020 | |
| CN | 112564767 A | * | 3/2021 | H04B 7/18506 |
| CN | 113162679 A | * | 7/2021 | H04B 7/18502 |
| CN | 113179116 A | * | 7/2021 | H04B 7/18506 |
| CN | 111953397 B | * | 9/2021 | H04B 7/18504 |
| CN | 113853018 A | * | 12/2021 | H04B 7/0617 |
| CN | 114499626 A | | 5/2022 | |
| CN | 113179116 B | * | 2/2023 | H04B 7/18506 |
| CN | 117354837 A | * | 1/2024 | H04W 24/02 |
| WO | WO-2018105263 A1 | * | 6/2018 | H04L 41/5003 |
| WO | WO-2021045862 A1 | * | 3/2021 | H04B 1/0475 |
| WO | 2021120425 A1 | | 6/2021 | |
| WO | WO-2023129485 A2 | * | 7/2023 | H04W 76/12 |
| WO | WO-2023246504 A1 | * | 12/2023 | |
| WO | WO-2024076755 A1 | * | 4/2024 | H04L 25/0204 |

OTHER PUBLICATIONS

"Outage probability minimization for low-altitude UAV-enabled full-duplex mobile relaying systems;" Hua et al., China Communications (vol. 15, Issue: 5, 2018, pp. 9-24), 2018-06-19. (Year: 2018).*

"Efficiency Maximization for UAV-Enabled Mobile Relaying Systems with Laser Charging," Zhao et al., IEEE Transactions on Wireless Communications, vol. 19, No. 5, pp. 3257-3272, May 2020; Dec. 16, 2019. (Year: 2020).*

Fu et al. "UAV-Assisted Over-the-Air Computation" published Jan. 25, 2021, publication unknown.

* cited by examiner

UNMANNED AERIAL VEHICLE-AIDED OVER-THE-AIR COMPUTING SYSTEM BASED ON FULL-DUPLEX RELAY AND TRAJECTORY AND POWER OPTIMIZATION METHOD THEREOF

CROSS-REFERENCE TO RELATED APPLICATIONS

This application is a continuation of PCT/CN2022/105164, filed on Jul. 12, 2022, which claims priority to Chinese Patent Application No. 202111561590.1, filed on Dec. 16, 2021, the contents of which are hereby incorporated by reference.

TECHNICAL FIELD

The present application relates to an unmanned aerial vehicle (UAV)-aided over-the-air computing system and a trajectory and power optimization method thereof, and in particular to a UAV-aided over-the-air computing system based on full-duplex relay and a trajectory and power optimization method.

BACKGROUND

Due to the advantages of strong mobility, flexible configuration and line-of-sight link, Unmanned Aerial Vehicle (UAV) is widely used in the field of wireless communication. UAV can also move to a place close enough to the sensor in the harsh field, which avoids long-distance information transmission, saves the power of the sensor and mitigates the influence of noise. In the air-to-ground transmission, the UAV is high in altitude and has usually a line-of-sight wireless transmission with the sensor, so the probability of channel depth fading is reduced. Because sensors and base stations can't communicate directly, using UAV as relay has become an important research direction of information collection in the Internet of Things based on UAV.

In 2021, in "UAV-assisted over-the-air computation" published by Min Fu et al., it is proposed to use high mobility and wireless line-of-sight transmission capability of UAV to assist the over-the-air computing system, so as to minimize the mean square error of over-the-air computing. In this system, UAV receives the information from sensors through the fusion of airborne base stations, and transmits and fuses the data of multiple sensors in a single time slot. However, in the wireless sensor network under complex environment, there is no direct communication between sensors and base stations.

SUMMARY

The objective of the present application is to provide an unmanned aerial vehicle (UAV)-aided over-the-air computing system based on full-duplex relay which realizes direct communication between sensors and a base station and a trajectory and power optimization method thereof.

The UAV-aided over-the-air computing system includes one base station, one UAV and multiple sensors placed on the ground.

The base station receives information from the UAV; the multiple sensors transmit information to the UAV at the same time.

As a full-duplex relay, the UAV works in a Fusion and Forward (FF) mode, receiving fused information transmitted by the multiple sensors and transmitting the information to the base station at the same time.

The UAV collects and fuses data of the sensors in a way of over-the-air computing, and forwards the data to the base station in a way of full-duplex relay; the UAV flies according to an optimized flight trajectory.

A trajectory and power optimization method of the application includes following steps:

S1, establishing a coordinate system with an initial position of UAV flight as an origin, jointly optimizing sensor transmitting power, UAV flight trajectory and denoising factor under constraints of transmitting power of the sensors and the UAV and information transmission rate, establishing an optimization problem with an aim at minimizing an time average mean square error of the over-the-air computing system and decomposing the optimization problem into a denoising factor $\eta[n]$ optimization sub-problem, a sensor transmitting power $p_k[n]$ optimization sub-problem, a UAV transmitting power $P[n]$ optimization sub-problem, UAV flight position $q[n]$ optimization sub-problem;

S2, solving each optimization sub-problem step by step by adopting an iterative optimization algorithm; and S3, obtaining optimal denoising factor $\eta[n]$, sensor transmitting power $p_k[n]$, UAV transmitting power $P[n]$ and UAV flight position $q[n]$ according to the S2.

Optionally, in the S1, the optimization problem is established in the coordinate system, and an expression of the optimization problem is:

problem1 $\min_{(p_k[n],P[n],q[n],\eta[n])} \overline{MSE} =$ $$\frac{1}{N}\sum_{n\in N}\frac{1}{K^2}\left(\sum_{k\in K}\left(\frac{\sqrt{p_k[n]}\sqrt{\beta_0}}{\sqrt{\eta[n]}(H^2+\|1[n]-w_k\|_2^2)^{\frac{\alpha}{4}}}-1\right)^2 + \frac{\beta_u^2 P[n]\beta_0}{\eta[n]L^\alpha} + \frac{\sigma^2}{\eta[n]}\right)$$

s.t. $0 \le p_k[n] \le P_k, \forall k, \forall n$ $0 \le \frac{1}{N}\sum_{n=1}^{N} p_k[n] \le \overline{P_k}, \forall k$ $\eta[n] \ge 0$ $\|q[n]-q[n-1]\|_2 \le V_{max}\delta, n = 1, 2, \ldots N$ $q[0] = [x_0, y_0]$ $q[N] = [x_N, y_N]$ $B\log_2\left(1+\frac{P[n]\beta_0}{(H^2+\|q[n]-w\|_2^2)\sigma^2}\right) \ge G_{min},$ where $\overline{MSE}$ is the time average mean square error of the over-the-air computing system of the UAV and is related to $p_k[n]$, $P[n]$, $q[n]$, and $\eta[n]$, $p_k[n]$ is transmitting power of the sensors k in time slots n, $P[n]$ is the UAV transmitting power in the time slots n, $q[n]$ is UAV flight position in the time slots n, $\eta[n]$ is denoising factor in the time slots n; $w_k$ is fixed horizontal position of the sensors, w is horizontal position of the base station, $\beta_0$ is channel gain per unit distance, $\sigma^2$ is additive white Gaussian noise power, $\beta_u$ is self-interference cancellation coefficient, L is distance from a sending end to a receiving end of the UAV, H is the lowest flight altitude at which the UAV does not need to ascend and descend in flight, $G_{min}$ is minimum information transmission rate between the UAV and the base station (BS), $\alpha$ is path loss index and $\alpha \ge 2$, N is the number of time slots of duration T, $T=N\delta$, where $\delta$ denotes time step; and $v_{max}$ is maximum flight speed of the UAV.

Optionally, in the S1, an expression of the denoising factor optimization sub-problem is:

problem2

$$\underset{\eta[n]\geq 0}{\text{minimize}} \sum_{n\in N}\left(\sum_{k\in K}\left(\frac{\sqrt{p_k[n]}\,|h_k[n]|}{\sqrt{\eta[n]}}-1\right)^2+\frac{\beta_u^2 P[n]\beta_0}{\eta[n]L^\alpha}+\frac{\sigma^2}{\eta[n]}\right).$$

When the denoising factor $\eta[n]$ is optimized, it is necessary to give the transmitting power $p_k[n]$ of the sensors k, the UAV transmitting power $P[n]$ and the UAV flight trajectory $q[n]$.

Optionally, in the S1, an expression of the sensor transmitting power optimization sub-problem is:

problem3

$$\underset{p_k[n]}{\text{minimize}} \sum_{n\in N}\left(\sum_{k\in K}\left(\frac{\sqrt{p_k[n]}\,|h_k[n]|}{\sqrt{\eta[n]}}-1\right)^2\right)$$

subject to $0 \leq p_k[n] \leq P_k, \forall k, \forall n,$ $$0 \leq \frac{1}{N}\sum_{n=1}^{N} p_k[n] \leq \bar{P}_k, \forall k.$$

When the transmitting power $p_k[n]$ of sensors k is optimized, it is necessary to give the denoising factor $\eta[n]$, the UAV transmitting power $P[n]$ and the UAV flight position $q[n]$.

Optionally, an expression of the UAV transmitting power optimization sub-problem is:

problem4

$$\underset{P[n]}{\text{minimize}} \sum_{n\in N} P\left[n1\left(\frac{\beta_u^2 P[n]\beta_0}{\eta[n]L^\alpha}\right)\right]$$

subject to $B\log_2\left(1+\frac{P[n]\beta_0}{(H^2+\|q[n]-w\|_2^2)\sigma^2}\right) \geq G_{min}.$ When the UAV transmitting power $P[n]$ is optimized, it is necessary to give the denoising factor $\eta[n]$, the transmitting power $p_k[n]$ of the sensors k and the UAV flight position $q[n]$.

Optionally, in the S1, the UAV flight trajectory optimization sub-problem is optimized by adopting a convex optimization method, and an expression of the UAV flight trajectory optimization sub-problem:

problem5

$$\underset{q[n]}{\text{minimize}} \frac{1}{N}\sum_{n\in N}\frac{1}{K^2}\left(\sum_{k\in K}\left(\frac{\sqrt{p_k[n]}\,\sqrt{\beta_0}}{\sqrt{\eta[n]}(H^2+\|q[n]-w_k\|_2^2)^{\frac{\alpha}{4}}}-1\right)^2\right)$$

subject to $\|q[n]-q[n-1]\|_2 \leq V_{max}\delta, n=1, 2, \ldots N$ $q[0] = [x_0, y_0]$ $q[N] = [x_N, y_N]$ -continued $$B\log_2\left(1+\frac{P[n]\beta_0}{(H^2+\|q[n]-w\|_2^2)\sigma^2}\right) \geq G_{min}.$$

When the UAV flight position $q[n]$ is optimized, it is necessary to give the denoising factor $\eta[n]$, the transmitting power $p_k[n]$ of the sensors k and the UAV transmitting power $P[n]$.

Optionally, the S2 is realized as follows:

S21, setting $\lambda$ as desired accuracy, setting initial iteration times r=0 and reference mean square error $R^0=1$;

S22, initializing the transmitting power $p_k^0[n]$ of the sensors k, the UAV transmitting power $P^0[n]$ and an initial flight trajectory $q^0[n]$ of the UAV;

S23, increasing iteration times r=r+1;

S24, solving the problem2 based on UAV trajectory $q^{r-1}[n]$ of a previous iteration, sensor transmitting power $p_k^{r-1}[n]$ of a previous iteration and UAV transmitting power $P^{r-1}[n]$ of a previous iteration to obtain denoise factors $\eta^r[n]$;

S25, solving the problem3 based on the UAV trajectory $q^{r-1}[n]$ of the previous iteration, the denoising factor $\eta^r[n]$ obtained in the S24 and the UAV transmitting power $P^{r-1}[n]$ of the previous iteration to obtain sensor transmitting power $p_k^r[n]$;

S26, solving the problem4 based on the UAV trajectory $q^{r-1}[n]$ of the previous iteration, the denoise factor $\eta^r[n]$ obtained in the S24 and the sensor transmitting power $p_k^r[n]$ obtained in the S25 to obtain UAV transmitting power $P^r[n]$;

S27, solving the problem5 based on the denoising factor $\eta^r[n]$ obtained in the S24, the sensor transmitting power $p_k^r[n]$ obtained in the S25 and the UAV transmitting power $P^r[n]$ obtained in the S26 to obtain UAV trajectory $q^r[n]$; and S28, letting $R^r=\overline{MSE}$, if $(R^{r-1}-R^r)/R^r \leq \lambda$, finishing solving, otherwise, going to the S23.

Compared with the prior art, the application has the following remarkable effects: firstly, the application adopts the UAV as the full-duplex relay to receive and fuse all sensor data, estimates an interesting function, and simultaneously transmits the estimated function value of the time slots to the base station, thus realizing the minimum mean square error under the guarantee of communication rate; secondly, in the process of jointly optimizing the UAV trajectory and sensor power, the optimization problem is decomposed into four independent optimization sub-problems, and the UAV trajectory and power are optimized with low complexity algorithm.

DETAILED DESCRIPTION OF THE EMBODIMENTS

The present application will be further described in detail with reference to the drawings and specific embodiments of the specification.

Figure 1:
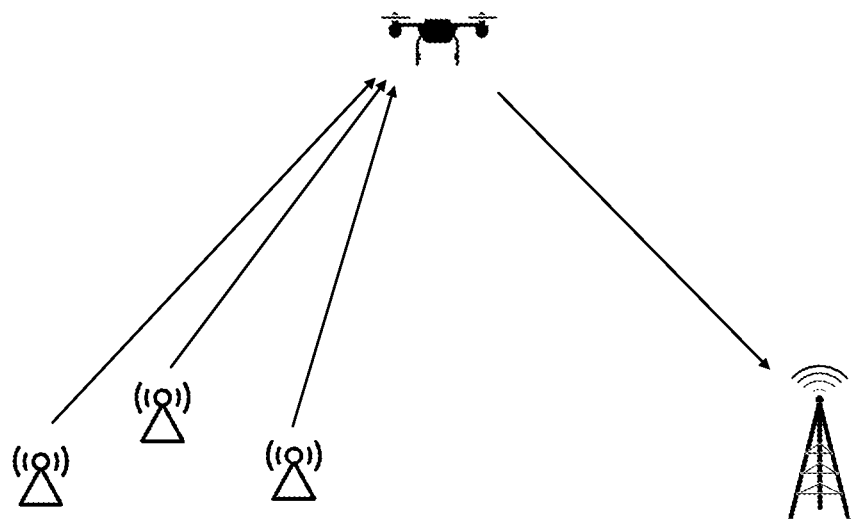
FIG. 1 is a schematic diagram of a model of an unmanned aerial vehicle (UAV)-aided over-the-air computing system of the present application.

As shown in FIG. 1, an unmanned aerial vehicle (UAV)-aided over-the-air computing system of the present application includes one base station, one UAV and K sensors. The UAV collects and fuses data of sensors on the ground in a way of over-the-air computing and forwards the data to the base station in a way of full-duplex relay. As a full-duplex relay, the UAV works in Fusion and Forward (FF) mode.

A trajectory and power optimization method is realized as follows:

S1, establishing a three-dimensional Cartesian coordinate system with a UAV flight starting point as an origin.

Horizontal coordinates of the sensors k are expressed as $w_k=[x_k, y_k] \in \square^{1 \times 2}$, where $x_k$ and $y_k$ represent an abscissa and an ordinate of the sensors, respectively.

The sensor group on the ground is represented as $K \square \{1, 2, \ldots K\}$, $K>1$, where K is the total number of the sensors.

During the flight of UAV, positions of the sensors on the ground are fixed, and the UAV has stored position information of the sensors. In addition, the UAV flies at a fixed altitude from the ground, denoted as H, a minimum flight altitude to ensure obstacle avoidance without frequent ascending and descending of the UAV. L is a fixed distance between a sending end and a receiving end of the UAV.

A time-varying trajectory of horizontal projection of the UAV is $q(t)=[x(t), y(t)] \in \square^{1 \times 2}$, a starting position $q[0]=[x_0, y_0]$ and an ending position $q[T]=[x_T, y_T]$, where $x_0$ and $y_0$ represent an abscissa and an ordinate of the sensors at an initial position, respectively and $x_T$ and $y_T$ represent an abscissa and an ordinate of the sensors at ending position, respectively.

A time discretization method is adopted to deal with the continuous UAV trajectory. A duration T of a task is equally divided into N time slots: $T=N\delta$, where $\delta$ is an time step. An appropriate time step is selected so that a distance between the UAV and the sensors is approximately constant in each time slot, that is $\delta v_{max} \square H$, where the $v_{max}$ is a maximum flight speed of the UAV. In time slots n, a movement constraint of the UAV in flight is expressed as:

$$\|q[n]-q[n-1]\|_2 \leq V_{max}\delta, n=1,2,\ldots N \quad (1),$$

$$q[0]=[x_0,y_0] \quad (2),$$

$$q[N]=[x_N,y_N] \quad (3),$$

where the q[n] is a UAV flight position in the time slots n, and the q[n−1] is a UAV flight position in time slots n−1.

The target of UAV computing is fused data of all sensors on the ground, so a target function $f[n]$ of the UAV computing is expressed as:

$$f[n] = \phi\left(\sum_{k \in K} \psi_k(Z_k[n])\right), \quad (4)$$

where the $\phi$ represents a post-processing function of the UAV, the $\psi_k$ presents a pre-processing function at the sensors k, the $Z_k[n]$ is data in the time slots n, and q[n] is the UAV flight position.

Pre-processed transmission signals of the sensor are $s_k[n] \square \psi_k(Z_k[n])$, and assuming that the transmission signals are independent of each other, they are normalized by zero mean and unit variance, namely: $E(s_k[n])=0$, $E(s_k[n]s_k^H[n])=1$, $E(s_i[n]s_j[n]^H)=0$, $\forall i \neq j$. Therefore, after post-processing of averaging, a processing function received by the UAV is:

$$f[n] = \frac{1}{K}\sum_{k \in K} s_k[n]. \quad (5)$$

As the full-duplex relay, the UAV receives data from the sensors in each time slot and sends the data to the base station. A received signal y[n] of the UAV in the time slots n is:

$$y[n] = \sum_{k \in K} b_{sk}[n]h_{sk}[n]s_k[n] + \beta_u b_u[n]h_u[n]s_u[n] + e[n], \quad (6)$$

where the $s_k[n]$ and the $s_u[n]$ are transmitted signal of the sensors and transmitted signal at the sending end of the UAV, respectively, the $\beta_u$ is a self-interference cancellation coefficient, the $b_{sk}[n]$ and the $b_u[n]$ are transmitted precoding coefficients of sensors k and the UAV, the e[n] represents additive white Gaussian noise, and the $h_{sk}[n]$ and the $h_u[n]$ are a channel model of the sensors and the UAV and a channel model of the sending end to the receiving end of the UAV respectively.

A constraint of the transmitting power of the sensors k is:

$$E(|b_{sk}[n]s_k[n]|^2)=|b_{sk}[n]|^2 \leq P_k \quad (7),$$

where $P_k$ is a maximum transmitting power of the sensors. At the same time, $P_k>0$. A constraint of average transmitting power $\overline{P_k}$:

$$\overline{P_k} \leq P \quad (8).$$

An estimated average value $\hat{f}[n]$ of UAV transmission data is:

$$\square f[n] = \frac{y[n]}{K\sqrt{\eta[n]}}, \quad (9)$$

where $\eta[n]$ is the denoising factor and K is the total number of the sensors.

Test performance is carried out with mean square error MSE[n], then:

$$MSE[n] = E\left[\left|\hat{f}[n] - f[n]\right|^2\right] \quad (10)$$

$$= \frac{1}{K}E\left[\left(\frac{y[n]}{\sqrt{\eta[n]}} - \sum_{k \in K} s_k[n]\right)\right]$$

$$= \frac{1}{K^2}\left(\sum_{k \in K}\left(\frac{b_{sk}[n]h_{sk}[n]}{\sqrt{\eta[n]}} - 1\right)^2 + \left(\frac{\beta_u b_u[n]h_u[n]}{\sqrt{\eta[n]}}\right)^2 + \frac{\sigma^2}{\eta[n]}\right)$$

$$= \frac{1}{K^2}\left(\sum_{k \in K}\left(\frac{\sqrt{p_k[n]}\sqrt{\beta_0}}{\sqrt{\eta[n]}(H^2+\|q[n]-w_k\|_2^2)^{\frac{\alpha}{4}}} - 1\right)^2 + \frac{\beta_u^2 P[n]\beta_0}{\eta[n]L^\alpha} + \frac{\sigma^2}{\eta[n]}\right),$$

where the $W_k$ is the fixed horizontal position of the sensors, $\beta_0$ is the channel gain per unit distance, $\beta_u$ is the self-interference cancellation coefficient, $\sigma^2$ is the additive white Gaussian noise power, L is the distance from the sending end to the receiving end of the UAV, H is the lowest flight altitude at which the UAV does not need to ascend and descend in flight, and $\alpha$ is the path loss index, $\alpha \geq 2$.

S2, solving each optimization sub-problem step by step Therefore, the following optimization problem problem1 is established:

problem1

$$\min_{(p_k[n], P[n], q[n], \eta[n])} \overline{MSE} = \frac{1}{N} \sum_{n \in N} \frac{1}{K^2} \left( \sum_{k \in K} \left( \frac{\sqrt{p_k[n]} \sqrt{\beta_0}}{\sqrt{\eta[n]} (H^2 + |q[n] - w_k|_2^2)^{\frac{\alpha}{4}}} - 1 \right)^2 + \frac{\beta_U^2 P[n] \beta_0}{\eta[n] L^\alpha} + \frac{\sigma^2}{\eta[n]} \right)$$ (11)

s.t. $= 0 \le p_k[n] \le P_k, \forall k, \forall n$ $$0 \le \frac{1}{N} \sum_{n=1}^{N} p_k[n] \le \bar{P}_k, \forall k$$

$\eta[n] \ge 0$ $\|q[n] - q[n-1]\|_2 \le V_{1wx}\delta, n = 1, 2 \ldots N$ $q[0] = [x_0, y_0]$ $q[N] = [x_N, y_N]$ $$B \log_2 \left( 1 + \frac{P[n]\beta_0}{(H^2 + \|q[n] - w\|_2^2)\sigma^2} \right) \ge G_{min},$$

where the $G_{min}$ is the minimum information transmission rate between the UAV and the BS (BS: base station), and the B is a communication bandwidth; the $p_k[n]$ is the transmitting power of the sensors k in time slots n, the P[n] is the UAV transmitting power in time slots n, the UAV flight position in time slots n, and the $\eta[n]$ is denoising factor in time slots n.

From the optimization problem problem1, it can be seen that optimization variables are highly coupled, so an iterative alternate optimization method is adopted to solve.

Sub-problem 1: when the denoising factor $\eta[n]$ is optimized, it is necessary to give the transmitting power $p_k[n]$ of the sensors k, the UAV transmitting power P[n] and the UAV flight position q[n]. At this time, the sub-problem 1 is expressed as:

problem2

$$\min_{\eta[n] \ge 0} \sum_{n \in N} \left( \sum_{k \in K} \left( \frac{\sqrt{p_k[n]} |h_k[n]|}{\sqrt{\eta[n]}} - 1 \right)^2 + \frac{\beta_u^2 P[n] \beta_0}{\eta[n] L^\alpha} + \frac{\sigma^2}{\eta[n]} \right).$$ (12)

The optimization problem is decomposed into N sub-problems, and each sub-problem $\eta[n]$ is optimized to minimize the mean square error of one time slot. Then the n-th sub-problem is expressed as:

$$\min_{\eta[n] \ge 0} \sum_{k \in K} \left( \frac{\sqrt{p_k[n]} |h_k[n]|}{\sqrt{\eta[n]}} - 1 \right)^2 + \frac{\beta_u^2 P[n] \beta_0}{\eta[n] L^\alpha} + \frac{\sigma^2}{\eta[n]}.$$ (13)

Letting $\gamma[n] = 1/\sqrt{\eta[n]}$, the problem represented by formula (13) is transformed into a convex quadratic problem, expressed as:

$$\min_{\gamma[n] \ge 0} \sum_{k \in K} \left( \sqrt{p_k[n]} |h_k[n]| \gamma[n] - 1 \right)^2 + \frac{\beta_u^2 P[n] \beta_0 \gamma^2[n]}{L^\alpha} + \sigma^2 \gamma^2[n].$$ (14)

By setting a first derivative of an objective function of formula (14) to zero, the optimal solution is obtained:

$$\eta^*[n] = \left( \frac{\sigma^2 + \beta_u^2 \beta_0 P[n] L^{-\alpha} + \sum_{k \in K} p_k[n] |h_k[n]|^2}{\sum_{k \in K} \sqrt{p_k[n]} |h_k[n]|} \right)^2.$$ (15)

Sub-problem 2: when the transmitting power $p_k[n]$ of the sensors k is optimized, it is necessary to give the denoising factor $\eta[n]$, the UAV transmitting power P[n] and the UAV flight position q[n]. At this time, the sub-problem 2 is expressed as:

problem3

$$\min_{p_k[n]} \sum_{n \in N} \left( \sum_{k \in K} \left( \frac{\sqrt{p_k[n]} |h_k[n]|}{\sqrt{\eta[n]}} - 1 \right)^2 \right)$$ (16)

subject to $0 \le p_k[n] \le P_k, \forall k, \forall n,$ $$0 \le \frac{1}{N} \sum_{n=1}^{N} p_k[n] \le \bar{P}_k, \forall k.$$

Because both $$\frac{\beta_u^2 P[n] \beta_0}{\eta[n] L^\alpha} \text{ and } \frac{\sigma^2}{\eta[n]}$$

in the objective function are constants, the $$\frac{\beta_u^2 P[n] \beta_0}{\eta[n] L^\alpha}$$

and the $$\frac{\sigma^2}{\eta[n]}$$

are ignored. The sub-problem 2 is decomposed into the following K sub-problems:

$$\min_{p_k[n]} \sum_{n \in N} \left( \left( \frac{\sqrt{p_k[n]} |h_k[n]|}{\sqrt{\eta[n]}} - 1 \right)^2 \right)$$ (17)

subject to $0 \le p_k[n] \le P_k, \forall k, \forall n,$ $$0 \le \frac{1}{N} \sum_{n=1}^{N} p_k[n] \le \bar{P}_k, \forall k.$$

Since formula (17) is a typical convex linear constrained quadratic programming problem, the formula (17) is solved by a standard convex optimization method.

Sub-problem 3: when the UAV transmitting power P[n] is optimized, it is necessary to give the denoising factor $\eta[n]$, the transmitting power $p_k[n]$ of the sensors k and the UAV flight position q[n]. At this time, the sub-problem 3 is expressed as:

problem4

$$\min_{P[n]} \sum_{n \in N} \left( \frac{\beta_u^2 P[n] \beta_0}{\eta[n] L^\alpha} \right) \quad (18)$$

subject to $B \log_2 \left( 1 + \frac{P[n] \beta_0}{(H^2 + \|q[n] - w\|_2^2)\sigma^2} \right) \geq G_{min}$.

For formula (18), since a constant term is ignored, so the formula (18) is solvable.

Sub-problem 4: when the UAV flight position q[n] is optimized, it is necessary to give the denoising factor η[n], the transmitting power $p_k[n]$ of the sensors k and the UAV transmitting power P[n]. At this time, the sub-problem 4 is expressed as:

problem5

$$\min_{q[n]} \frac{1}{N} \sum_{n \in N} \frac{1}{K^2} \left( \sum_{k \in K} \left( \frac{\sqrt{p_k[n]} \sqrt{\beta_0}}{\sqrt{\eta[n]} (H^2 + \|q[n] - w_k\|_2^2)^{\frac{\alpha}{4}}} - 1 \right) \right)^2 \quad (19)$$

subject to $\|q[n] - q[n-1]\|_2 \leq V_{max} \delta, n = 1, 2, \ldots N$ $q[0] = [x_0, y_0]$ $q[N] = [x_N, y_N]$ $B \log_2 \left( 1 + \frac{P[n] \beta_0}{(H^2 + \|q[n] - w_k\|_2^2)\sigma^2} \right) \geq G_{min}$, $$f_k[n] = \frac{p_k[n] \beta_0 / \eta[n]}{(H^2 + \|q[n] - w_k\|_2^2)^{\frac{\alpha}{2}}}, \quad (20)$$

subject to $g_k[n] = \frac{2\sqrt{p_k[n]} \sqrt{\beta_0} / \sqrt{\eta[n]}}{(H^2 + \|q[n] - w_k\|_2^2)^{\frac{\alpha}{4}}}, \quad (21)$ and the UAV trajectory optimization problem is transformed into:

$$\min_{q[n]} \sum_{n \in N} \sum_{k \in K} (f_k[n] - g_k[n]). \quad (22)$$

By introducing a relaxation variable $s=\{s_k[n]=\|q[n]-w_k\|_2^2, \forall k, \forall n\}$, the sub-problem 4 is expressed as:

$$\min_{q[n], s_k[n]} \sum_{k \in K} \sum_{n \in N} \left( \frac{p_k[n] \beta_0 / \eta[n]}{(H^2 + s_k[n])^{\frac{\alpha}{2}}} - g_k[n] + 1 \right). \quad (23)$$

According to Taylor's formula, a global lower bound $\hat{g}_k^{lb}[n]$ is obtained:

$$g_k[n] \geq g_k^r[n] + \nabla_{q[n]} g_k[n] |_{q[n]=q^r[n]} \quad (24)$$

$(\|q[n] - w_k\|_2^2 - \|q^r[n] - w_k\|_2^2) \square \hat{g}_k^{lb}[n],$ where $\nabla_{q[n]} g_k[n] |_{q[n]=q^r[n]} = -\frac{\alpha \sqrt{p_k[n]} \sqrt{\beta_0} / \sqrt{\eta[n]}}{2(H^2 + \|q^r[n] - w_k\|_2^2)^{\frac{\alpha+4}{4}}}.$ An inequality is obtained at the same time:

$$\|q[n]-w_k\|_2^2 \geq \|q^r[n]-w_k\|_2^2 + 2(q^r[n]-w_k)^T(q[n]-q^r[n]) \quad (25).$$

The sub-problem 4 is further transformed into:

$$\min_{q[n], s_k[n]} \sum_{k \in K} \sum_{n \in N} \left( \frac{p_k[n] \beta_0 / \eta[n]}{(H^2 + s_k[n])^{\frac{\alpha}{2}}} - \hat{g}_k^{lb}[n] + 1 \right) \quad (26)$$

subject to $\|q[n] - q[n-1]\|_2 \leq V_{max} \delta, n = 1, 2, \ldots N$ $q[0] = [x_0, y_0]$ $q[N] = [x_N, y_N]$ $B \log_2 \left( 1 + \frac{P[n] \beta_0}{(H^2 + \|q[n] - w\|_2^2)\sigma^2} \right) \geq G_{min}$ $s_k[n] \geq 0$ $s_k[n] \leq \|q^r[n] - w_k\|_2^2 + 2(q^r[n] - w_k)^T(q[n] - q^r[n]).$ Therefore, formula (26) transformed from the sub-problem 4 is a Quadratical Constraint Quadratic Programming (QCQP) problem and is solved by the standard convex optimization method. Through continuous iterative solution, the optimal power and UAV trajectory are finally obtained.

In order to minimize the time average mean square error of the system, the application adopts iterative optimization algorithm to solve each sub-problem step by step, and implementation steps are as follows:

S21, setting λ as desired accuracy, UAV flight time as T, the number of the sensor as K, maximum transmitting power as $P_k[n]$ and average transmitting power as $\bar{P}_k[n]$, setting initial iteration times r=0 and reference mean square error $R^0=1$;

S22, initializing the transmitting power $p_k^0[n]$ of the sensors k, the UAV transmitting power $P^0[n]$ and an initial flight position $q^0[n]$ of the UAV;

S23, r=r+1;

S24, solving the problem2 based on $q^{r-1}[n]$, $p_k^{r-1}[n]$ and $P^{r-1}[n]$ to obtain $\eta^r[n]$;

S25, solving the problem3 the $q^{r-1}[n]$, the $\eta^r[n]$ and the $P^{r-1}[n]$ to obtain $p_k^r[n]$;

S26, solving the problem4 based on the $q^{r-1}[n]$, the $\eta^r[n]$ and the $p_k^r[n]$ to obtain $P^r[n]$;

S27, solving the problem5 based on the $\eta^r[n]$, the $p_k^r[n]$ and the $P^r[n]$ to obtain $q^r[n]$;

S28, letting $R^r=\overline{MSE}$, if $(R^{r-1}-R^r)/R^r \leq \lambda$, proceeding next step, otherwise, going to the S23; and S29, solving and outputting η[n], q[n], $p_k[n]$, P[n].

The simulation results of the application are as follows.

The simulation conditions are as follows: UAV flight altitude H=50 m, maximum speed 8 m/s, channel gain $\beta_0=-40$ dB, self-interference cancellation coefficient $\beta_u=-60$ dB, noise power $\sigma^2=-80$ dBm, and algorithm accuracy $\lambda=10^{-4}$.

Figure 2:
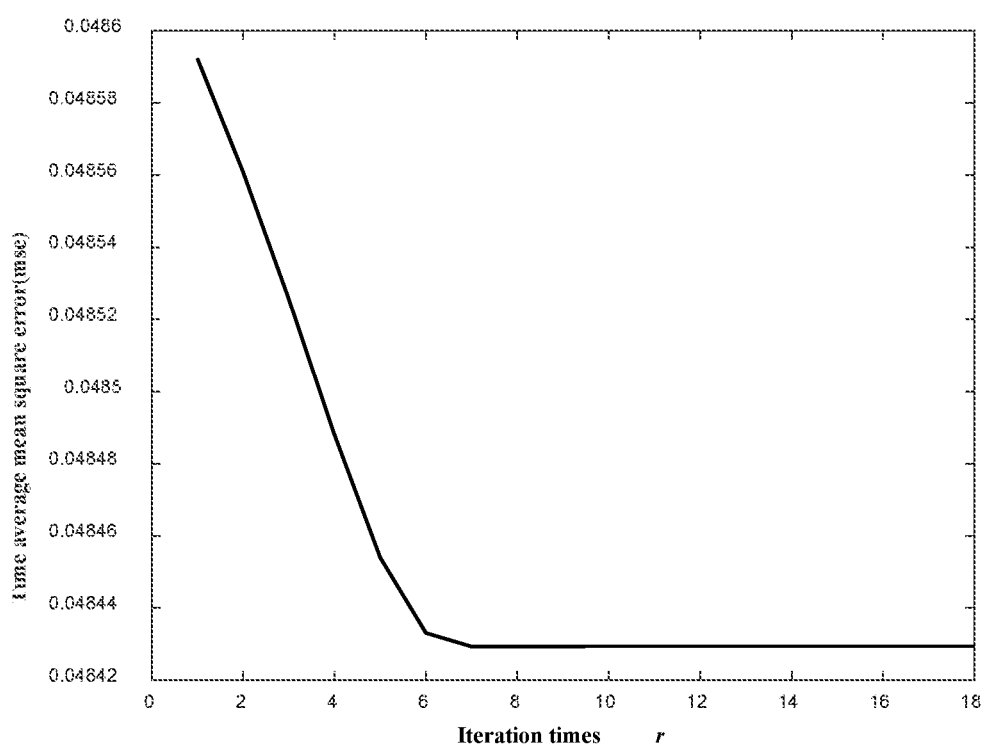
FIG. 2 is a schematic diagram of simulation results of the present application.

The simulation results are shown in FIG. 2, which shows that the time average mean square error obtained by the method of the application successfully converges after several iterations, which fully demonstrates the effectiveness of the method.

The simulation results are shown in FIG. 2 and it is shown that the time average mean square error obtained by the method of the application is successfully converged after several iterations, which fully demonstrates the method is effective.

What is claimed is:

1. A trajectory and power optimization method of an unmanned aerial vehicle (UAV)-aided over-the-air computing system based on full-duplex relay, comprising one base station, one UAV and multiple sensors placed on a ground, the method comprising the following steps:

S1, establishing a coordinate system with an initial position of UAV flight as an origin, jointly optimizing sensor transmitting power, a UAV flight trajectory and a denoising factor under constraints of transmitting power of sensors and the UAV and an information transmission rate, establishing an optimization problem with an aim at minimizing an time average mean square error of the over-the-air computing system and decomposing the optimization problem into a denoising factor $\eta[n]$ optimization sub-problem, a sensor transmitting power $p_k[n]$ optimization sub-problem, a UAV transmitting power $P[n]$ optimization sub-problem, and a UAV flight position $q[n]$ optimization sub-problem, wherein the optimization problem is established in the coordinate system, and an expression of the optimization problem is:

problem1

$$\min_{(p_k[n],P[n],q[n],\eta[n])} \overline{MSE}$$

$$= \frac{1}{N}\sum_{n\in N}\frac{1}{K^2}\left(\sum_{k\in K}\left(\frac{\sqrt{p_k[n]}\sqrt{\beta_0}}{\sqrt{\eta[n]}(H^2+\|q[n]-w_k\|_2^2)^{\frac{\alpha}{4}}}-1\right)^2 + \frac{\beta_u^2 P[n]\beta_0}{\eta[n]L^\alpha}+\frac{\sigma^2}{\eta[n]}\right)$$

s.t. $0 \le p_k[n] \le P_k, \forall k, \forall n$ $0 \le \frac{1}{N}\sum_{n=1}^{N} p_k[n] \le \bar{P}_k, \forall k$ $\eta[n] \ge 0$ $\|q[n]-q[n-1]\|_2 \le V_{max}\delta, n=1,2\ldots N$ $q[0] = [x_0, y_0]$ $q[N] = [x_N, y_N]$ $B\log_2\left(1+\frac{P[n]\beta_0}{(H^2+\|q[n]-w\|_2^2)\sigma^2}\right) \ge G_{min},$ wherein $\overline{MSE}$ is the time average mean square error of the UAV-aided over-the-air computing system and is related to $p_k[n]$, $P[n]$, $q[n]$, and $\eta[n]$, $p_k[n]$ is the transmitting power of the sensors k in a time slot n, $P[n]$ is the UAV transmitting power in the time slot n, $q[n]$ is UAV flight position in the time slot n, $\eta[n]$ is the denoising factor in the time slot n; $W_k$ is a fixed horizontal position of the sensors, w is a horizontal position of a base station, $\beta_0$ is a channel gain per unit distance, $\sigma^2$ is an additive white Gaussian noise power, $\beta_u$ is a self-interference cancellation coefficient, L is a distance from a sending end to a receiving end of the UAV, H is a lowest flight altitude not to be ascended and descended in flight by the UAV, $G_{min}$ is a minimum information transmission rate between the UAV and the base station (BS), $\alpha$ is a path loss index and $\alpha \ge 2$; N is a number of time slots in a duration T, T=N$\delta$, wherein $\delta$ denotes a time step; and $v_{max}$ is a maximum flight speed of the UAV;

S2, solving each optimization sub-problem step by step by adopting an iterative optimization algorithm; and S3, obtaining an optimal denoising factor $\eta[n]$ the sensor transmitting power $p_k[n]$, the UAV transmission power $P[n]$ and the UAV flight position $q[n]$ according to the S2; and flying the UAV according to the optimized flight trajectory.

2. The trajectory and power optimization method of a UAV-aided over-the-air computing system based on full-duplex relay according to claim 1, wherein in the S1, an expression of the denoising factor optimization sub-problem is:

problem2

$$\underset{\eta[n]\ge 0}{\text{minimize}}\sum_{n\in N}\left(\sum_{k\in K}\left(\frac{\sqrt{p_k[n]}|h_k[n]|}{\sqrt{\eta[n]}}-1\right)^2+\frac{\beta_u^2 P[n]\beta_0}{\eta[n]L^\alpha}+\frac{\sigma^2}{\eta[n]}\right);$$

when the denoising factor $\eta[n]$ is optimized, it is necessary to give the transmitting power $p_k[n]$ of the sensors k, the UAV transmitting power $P[n]$ and the UAV flight trajectory $q[n]$.

3. The trajectory and power optimization method of a UAV-aided over-the-air computing system based on full-duplex relay according to claim 1, wherein in the S1, an expression of the sensor transmitting power optimization sub-problem is:

problem3

$$\underset{p_k[n]}{\text{minimize}}\sum_{n\in N}\left(\sum_{k\in K}\left(\frac{\sqrt{p_k[n]}|h_k[n]|}{\sqrt{\eta[n]}}-1\right)^2\right)$$

subject to $0 \le p_k[n] \le P_k, \forall k, \forall n,$ $0 \le \frac{1}{N}\sum_{n=1}^{N} p_k[n] \le \bar{P}_k, \forall k,$ when the transmitting power $p_k[n]$ of sensors k is optimized, it is necessary to give the denoising factor $\eta[n]$, the UAV transmitting power $P[n]$ and the UAV flight position $q[n]$.

4. The trajectory and power optimization method of a UAV-aided over-the-air computing system based on full-duplex relay according to claim 1, wherein an expression of the UAV transmitting power optimization sub-problem is:

problem4

$$\underset{P[n]}{\text{minimize}}\sum_{n\in N}\left(\frac{\beta_u^2 P[n]\beta_0}{\eta[n]L^\alpha}\right)$$

subject to $B\log_2\left(1+\frac{P[n]\beta_0}{(H^2+\|q[n]-w\|_2^2)\sigma^2}\right) \ge G_{min};$ when the UAV transmitting power p[n] is optimized, it is necessary to give the denoising factor $\eta[n]$, the transmitting power $p_k[n]$ of the sensors k and the UAV flight position $q[n]$.

5. The trajectory and power optimization method of a UAV-aided over-the-air computing system based on full-duplex relay according to claim 1, wherein in the S1, the UAV flight trajectory optimization sub-problem is optimized by adopting a convex optimization method, and an expression of the UAV flight trajectory optimization sub-problem:

problem5

$$\underset{q[n]}{\text{minimize}} \frac{1}{N}\sum_{n\in N}\frac{1}{K^2}\left(\sum_{k\in K}\left(\frac{\sqrt{p_k[n]}\sqrt{\beta_0}}{\sqrt{\eta[n]}(H^2+\|q[n]-w_k\|_2^2)^{\frac{\alpha}{4}}}-1\right)^2\right)$$

subject to $\|q[n]-q[n-1]\|_2 \leq V_{max}\delta, n=1,2,\ldots N$ $q[0] = [x_0, y_0]$ $q[N] = [x_N, y_N]$ $B\log_2\left(1+\frac{P[n]\beta_0}{(H^2+\|q[n]-w\|_2^2)\sigma^2}\right) \geq G_{min};$ when the UAV flight position q[n] is optimized, it is necessary to give the denoising factor η[n], the transmitting power $p_k[n]$ of the sensors k and the UAV transmitting power P[n].

6. The trajectory and power optimization method of a UAV-aided over-the-air computing system based on full-duplex relay according to claim 1, wherein the S2 is realized as follows:

S21, setting λ as desired accuracy, setting initial iteration times r=0 and reference mean square error $R^0=1$;

S22, initializing the transmitting power $p_k^0[n]$ of the sensors k, the UAV transmitting power $p^0[n]$ and an initial flight trajectory $q^0[n]$ of the UAV;

S23, increasing iteration times r=r+1;

S24, solving the problem2 based on UAV trajectory $q^{r-1}[n]$ of a previous iteration, sensor transmitting power $p_k^{r-1}[n]$ of a previous iteration and UAV transmitting power $p^{r-1}[n]$ of a previous iteration to obtain denoise factors $\eta^r[n]$;

S25, solving the problem3 based on the UAV trajectory $q^{r-1}[n]$ of the previous iteration, the denoising factor $\eta^r[n]$ obtained in the S24 and the UAV transmitting power $P^{r-1}[n]$ of the previous iteration to obtain sensor transmitting power $p_k^r[n]$;

S26, solving the problem4 based on the UAV trajectory $q^{r-1}[n]$ of the previous iteration, the denoise factor $\eta^r[n]$ In obtained in the S24 and the sensor transmitting power $P^{r-1}[n]$ obtained in the S25 to obtain UAV transmitting power $P^r[n]$;

S27, solving the problem5 based on the denoising factor $\eta^r[n]$ obtained in the S24, the sensor transmitting power $p_k^r[n]$ obtained in the S25 and the UAV transmitting power $P^r[n]$ obtained in the S26 to obtain UAV trajectory $q^r[n]$; and S28, letting $R^r=\overline{MSE}$, finishing solving when $(R^{r-1}-R^r)/R^r \leq \lambda$; otherwise, going to the S23.

\* \* \* \* \*